US012811810B2

(12) United States Patent
Bommisetty et al.

(10) Patent No.: US 12,811,810 B2
(45) Date of Patent: Nov. 24, 2026

(54) AUTOMATIC CERTIFICATE MANAGEMENT IN 5GC NETWORK

(71) Applicant: Nokia Technologies Oy, Espoo (FI)

(72) Inventors: Sireesha Bommisetty, Bangalore (IN); Mallikarjunudu Makham, Bangalore (IN); Topuri Brahmaiah, Bangalore (IN); German Peinado Gomez, Warsaw (PL)

(73) Assignee: Nokia Technologies Oy, Espoo (FI)

(*) Notice: Subject to any disclaimer, the term of this patent is extended or adjusted under 35 U.S.C. 154(b) by 426 days.

(21) Appl. No.: 18/329,821

(22) Filed: Jun. 6, 2023

(65) Prior Publication Data

US 2023/0412396 A1 Dec. 21, 2023

(30) Foreign Application Priority Data

Jun. 20, 2022 (IN) ............................ 202241035290

(51) Int. Cl.
*H04L 9/32* (2006.01)
*H04L 9/30* (2006.01)

(52) U.S. Cl.
CPC .......... *H04L 9/3265* (2013.01); *H04L 9/3073* (2013.01)

(58) Field of Classification Search
CPC . H04L 9/006; H04L 9/007; H04L 9/30; H04L 9/3066; H04L 9/3073; H04L 9/32; H04L 9/321; H04L 9/3215; H04L 9/3226; H04L 9/3236; H04L 9/3263; H04L 9/3265; H04L 9/3268; H04L 9/40; H04L 63/04;
(Continued)

(56) References Cited

U.S. PATENT DOCUMENTS 7,275,155 B1 * 9/2007 Aull ...................... H04L 9/3265 713/157
7,484,089 B1 * 1/2009 Kogen .................. H04L 63/062 726/10

(Continued)

OTHER PUBLICATIONS

Notice of Allowance received for corresponding European Patent Application No. 23175903.6, dated Jul. 9, 2024, 8 pages.

(Continued)

*Primary Examiner* — Yuwen Pan
*Assistant Examiner* — Samuel H. Leonard
(74) *Attorney, Agent, or Firm* — Brake Hughes Bellermann LLP

(57) ABSTRACT

A method for automatic certificate management in 5G Core network includes: sending a first request to a first certificate server, the first request comprising a first public key of a first public-private key pair for the network function; receiving a first response from the first certificate server, the first response comprising an identity certificate for the network function and a first certificate chain of the first certificate server, wherein the identity certificate is based on the first public key; sending a second request to a second certificate server, the second request comprising a second public key of a second public-private key pair for the network function and the identity certificate along with the first certificate chain; and receiving a second response from the second certificate server, the second response comprising an end entity certificate for the network function entity and a second certificate chain of the second certificate server.

13 Claims, 7 Drawing Sheets

400

(58) Field of Classification Search
CPC ... H04L 63/0407; H04L 63/06; H04L 63/061; H04L 63/08; H04L 63/0823; H04L 63/20
See application file for complete search history.

(56) References Cited

U.S. PATENT DOCUMENTS

| | | | | |
|---|---|---|---|---|
| 9,258,295 | B1 * | 2/2016 | Nedeltchev | H04L 63/0823 |
| 9,641,344 | B1 * | 5/2017 | Kim | H04L 9/006 |
| 9,660,978 | B1 * | 5/2017 | Brown et al. | H04L 63/0823 |
| 11,323,274 | B1 * | 5/2022 | Bowen | H04L 9/3268 |
| 11,870,768 | B1 * | 1/2024 | Vishwakarma | H04W 8/26 |
| 11,888,997 | B1 * | 1/2024 | Bowen | H04L 9/3247 |
| 12,342,165 | B2 * | 6/2025 | Xie | H04W 12/082 |
| 2004/0268142 | A1 * | 12/2004 | Karjala | H04L 63/0823 726/15 |
| 2005/0076205 | A1 * | 4/2005 | Thornton | H04L 63/20 715/741 |
| 2009/0222902 | A1 * | 9/2009 | Bender | H04L 63/0823 726/10 |
| 2011/0213965 | A1 * | 9/2011 | Fu | H04L 63/0823 709/248 |
| 2013/0254535 | A1 * | 9/2013 | Akehurst | H04L 9/32 713/158 |
| 2016/0127353 | A1 * | 5/2016 | Thomas | H04L 9/006 713/156 |
| 2016/0142216 | A1 * | 5/2016 | Turner | H04L 9/006 713/156 |
| 2016/0315777 | A1 * | 10/2016 | Lloyd | H04L 9/3265 |
| 2018/0069708 | A1 * | 3/2018 | Thakore | H04L 9/006 |
| 2018/0323977 | A1 * | 11/2018 | Hojsik | H04L 67/12 |
| 2019/0149545 | A1 * | 5/2019 | Arora | H04W 12/06 726/7 |
| 2020/0028696 | A1 * | 1/2020 | Malluru | H04L 9/3265 |
| 2020/0059372 | A1 * | 2/2020 | Goeringer | H04L 9/3265 |
| 2020/0259896 | A1 | 8/2020 | Sachs et al. | |
| 2021/0083882 | A1 * | 3/2021 | Venable, Sr. | H04L 9/3268 |
| 2021/0250182 | A1 * | 8/2021 | Melo | H04L 9/3271 |
| 2021/0297400 | A1 * | 9/2021 | Lehtovirta | H04W 12/06 |
| 2021/0314171 | A1 * | 10/2021 | Choyi | H04L 9/3247 |
| 2021/0377051 | A1 * | 12/2021 | Pai | H04L 9/0825 |
| 2021/0377054 | A1 * | 12/2021 | Mahajan | H04L 63/0823 |
| 2023/0353555 | A1 * | 11/2023 | Kim | G06F 21/44 |

OTHER PUBLICATIONS

"3rd Generation Partnership Project; Technical Specification Group Services and System Aspects; Study on Automated Certificate Management in SBA; (Release 18)", 3GPP TR 33.876, V0.2.0, May 2022, pp. 1-15.

Adams et al., "Internet X.509 Public Key Infrastructure Certificate Management Protocol (CMP)", RFC 4210, Network Working Group, Sep. 2005, pp. 1-95.

"3rd Generation Partnership Project; Technical Specification Group Services and System Aspects; Network Domain Security (NDS); Authentication Framework (AF) (Release 17)", 3GPP TS 33.310, V17.2.0, Mar. 2022, pp. 1-59.

"3rd Generation Partnership Project; Technical Specification Group Services and System Aspects;Network Domain Security (NDS); IP network layer security (Release 17)", 3GPP TS 33.210, V17.0.0, Dec. 2021, pp. 1-28.

"3rd Generation Partnership Project; Technical Specification Group Services and System Aspects; Study on Automated Certificate Management in SBA; (Release 18)", 3GPP TR 33.876, V0.6.0, Feb. 2023, pp. 1-59.

Extended European Search Report received for corresponding European Patent Application No. 23175903.6, dated Oct. 20, 2023, 6 pages.

Yan et al., "Decentralized Certificate Management for Network Function Virtualization (NFV) Implementation in 5G Networks", International Conference on Mobile Multimedia Communications, 2021, pp. 81-93.

* cited by examiner

200

400

600

AUTOMATIC CERTIFICATE MANAGEMENT IN 5GC NETWORK

TECHNICAL FIELD

Embodiments of the present disclosure generally relate to wireless communication, and more particularly, to automatic certificate management in 5G Core (5GC) network.

BACKGROUND $3^{rd}$ Generation Partnership Project (3GPP) has defined the Service-Based Architecture (SBA) of 5GC, which is composed of multiple services provided by so called Network Functions (NFs).

For a secure communication in any of the following domains, network elements involved in the secure communication should have digital certificates as their identities:

1) Intra core network/PLMN communication;
2) Inter core network/PLMN communication;
3) Core Network and RAN communication; and
4) Core network and Data Network communication.

The digital certificates to the network elements can be basically provided in two ways: 1) manual installation; and 2) automatic certificate fetching from a certificate server.

In the manual installation, an operator has to create an end entity certificate along with a private key for every network element and install them at each network element via out-of-band mechanism which is cumbersome due to the numerous network elements, cost and time involved in the installation. Due to this, the operator always prefers to have automatic installation of the certificate at every network element. To achieve this automatic installation of the certificate at every network element, any one of the following are required for an initial authentication between the network element and the certificate server:

1) Secure way of configuring Pre-Shared key (PSK) and RefNum: this is a tedious process to the operator as the operator must create "n" number of psk-refnums at the certificate server and configure the respective psk-refnum at each network element via secure out of band mechanism;
2) Hardware based vendor certificate: this is most suitable solution for embedded software applications running on a dedicated hardware.

But in the SBA of 5GC, the Network Functions are software applications not bound with any dedicated hardware, and need to setup secure communications among them and eventually with other external entities (e.g. Network Exposure Function (NEF), Security Edge Protection Proxy (SEPP)). Currently there is no solution identified and standardized for the automatic certificate management for the NFs in the SBA of 5GC.

SUMMARY

This summary is provided to introduce simplified concepts of subnetwork configuration and procedures to enable subnetwork operations, particularly on subnetwork identities. This summary is not intended to identify key features or essential features of the claimed subject matter, nor is it intended to be used to limit the scope of the claimed subject matter.

According to a first aspect of the disclosure, there is provided a network entity for implementing a network function. The network entity comprises at least one processor, and at least one memory storing instructions that, when executed by the one or more processors, cause the network entity to send a first request to a first certificate server, the first request comprising a first public key of a first public-private key pair for the network function; receive a first response from the first certificate server, the first response comprising an identity certificate for the network function and a first certificate chain of the first certificate server, wherein the identity certificate is based on the first public key; send a second request to a second certificate server, the second request comprising a second public key of a second public-private key pair for the network function and the identity certificate along with the first certificate chain; and receive a second response from the second certificate server, the second response comprising an end entity certificate for the network function and a second certificate chain of the second certificate server.

According to a second aspect of the disclosure, there is provided a network entity for implementing a certificate management network function. The network entity comprises at least one processor, and at least one memory storing instructions that, when executed by the one or more processors, cause the network entity to send a first request to a first certificate server, the first request comprising a first public key of a first public-private key pair for the certificate management network function; receive a first response from the first certificate server, the first response comprising an identity certificate for the certificate management network function and a first certificate chain of the first certificate server, wherein the identity certificate is based on the first public key; send a second request to a second certificate server, the second request comprising at least one second public key of at least one second public-private key pair for at least one network function and the identity certificate along with the first certificate chain; and receive a second response from the second certificate server, the second response comprising at least one end entity certificate for the at least one network function and a second certificate chain of the second certificate server.

According to a third aspect of the disclosure, there is provided a method performed by a network entity for implementing a network function. The method comprises: sending a first request to a first certificate server, the first request comprising a first public key of a first public-private key pair for the network function; receiving a first response from the first certificate server, the first response comprising an identity certificate for the network function and a first certificate chain of the first certificate server, wherein the identity certificate is based on the first public key; sending a second request to a second certificate server, the second request comprising a second public key of a second public-private key pair for the network function and the identity certificate along with the first certificate chain; and receiving a second response from the second certificate server, the second response comprising an end entity certificate for the network function and a second certificate chain of the second certificate server.

According to a fourth aspect of the disclosure, there is provided a method performed by a network entity for implementing a certificate management network function. The method comprises: sending a first request to a first certificate server, the first request comprising a first public key of a first public-private key pair for the certificate management network function; receiving a first response from the first certificate server, the first response comprising an identity certificate for the certificate management network function and a first certificate chain of the first certificate server, wherein the identity certificate is based on the first public key; sending a second request to a second certificate server, the second request comprising at least one second public key of at least one second public-private key pair for at least one network function and the identity certificate along with the first certificate chain; and receiving a second response from the second certificate server, the second response comprising at least one end entity certificate for the at least one network function and a second certificate chain of the second certificate server.

According to a fifth aspect of the present disclosure, it is provided a computer readable storage medium, on which instructions are stored, when executed by at least one processor, the instructions cause the at least one processor to perform any method according to the third and/or fourth aspects.

According to a sixth aspect of the present disclosure, it is provided a computer program product comprising instructions which when executed by at least one processor, cause the at least one processor to perform any method according to the third and/or fourth aspects.

It is to be understood that the summary section is not intended to identify key or essential features of embodiments of the present disclosure, nor is it intended to be used to limit the scope of the present disclosure. Other features of the present disclosure will become easily comprehensible through the following description.

BRIEF DESCRIPTION OF THE DRAWINGS

Some example embodiments will now be described with reference to the accompanying drawings in which.

DETAILED DESCRIPTION

Figure 1:
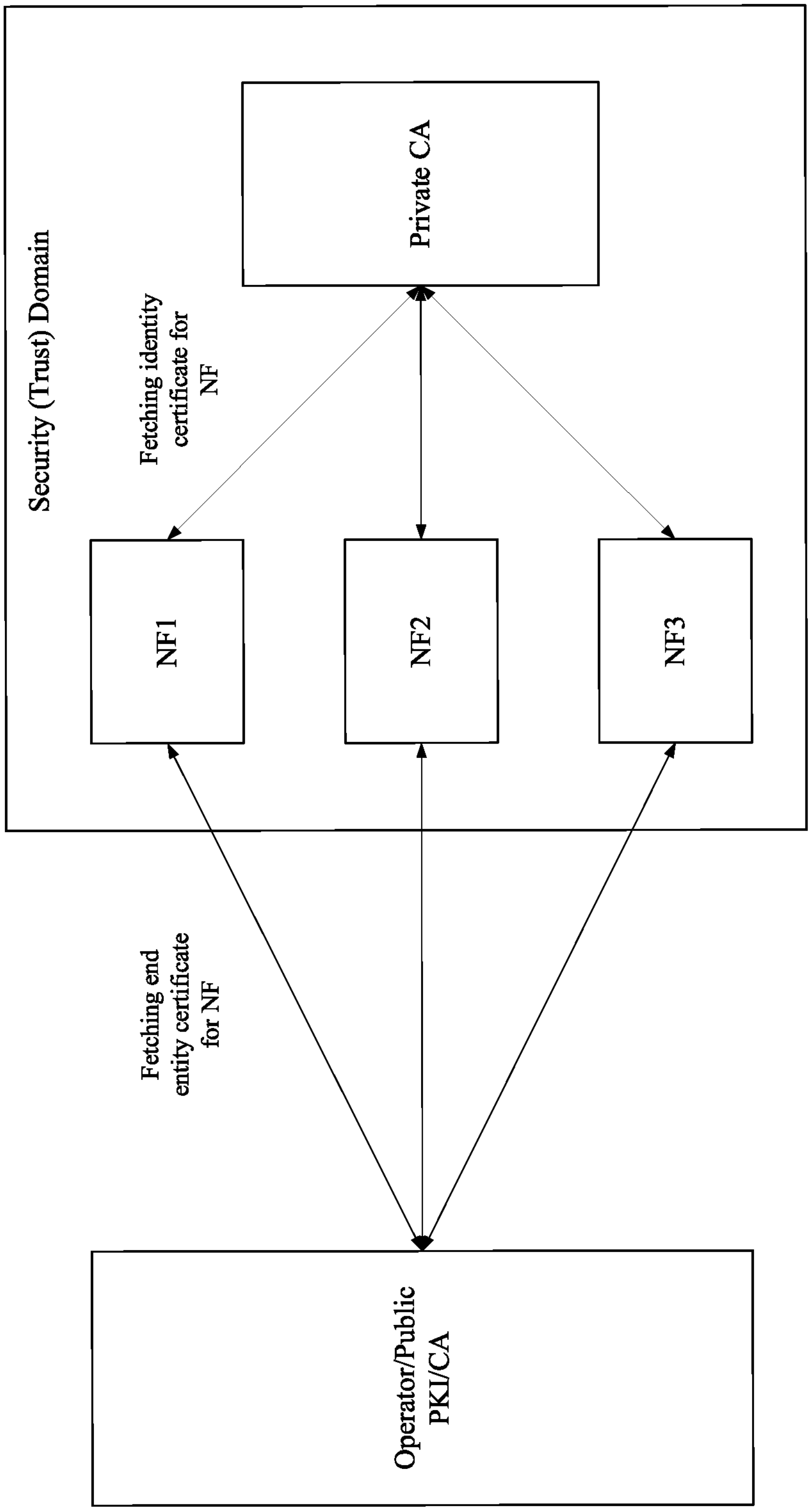
FIG. 1 illustrates a schematic deployment in which some embodiments of the present disclosure can be implemented.

Some example embodiments will now be described more fully hereinafter with reference to the accompanying drawings, in which some, but not all embodiments are shown. Indeed, the example embodiments may take many different forms and should not be construed as limited to the embodiments set forth herein; rather, these embodiments are provided so that this disclosure will satisfy applicable legal requirements. Like reference numerals refer to like elements throughout.

In the following description and claims, unless defined otherwise, all technical and scientific terms used herein have the same meaning as commonly understood by one of ordinary skills in the art to which this disclosure belongs.

References in the present disclosure to "one embodiment", "an embodiment", "an example embodiment", and the like indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an example embodiment, it is submitted that it is within the knowledge of one skilled in the art to affect such feature, structure, or characteristic in connection with other embodiments whether or not explicitly described.

It shall be understood that although the terms "first" and "second" etc. may be used herein to describe various elements, these elements should not be limited by these terms. These terms are only used to distinguish one element from another. For example, a first element could be termed a second element, and similarly, a second element could be termed a first element, without departing from the scope of example embodiments. As used herein, the term "and/or" includes any and all combinations of one or more of the listed terms.

The terminology used herein is for the purpose of describing particular embodiments only and is not intended to be limiting of example embodiments. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components etc., but do not preclude the presence or addition of one or more other features, elements, components and/or combinations thereof.

As used in this application, the term "circuitry" may refer to one or more or all of the following:

(a) hardware-only circuit implementations (such as implementations in only analog and/or digital circuitry) and (b) combinations of hardware circuits and software, such as (as applicable):

(i) a combination of analog and/or digital hardware circuit(s) with software/firmware and (ii) any portions of hardware processor(s) with software (including digital signal processor(s)), software, and memory(ies) that work together to cause an apparatus, such as a mobile phone or server, to perform various functions) and (c) hardware circuit(s) and or processor(s), such as a microprocessor(s) or a portion of a microprocessor(s), that requires software (e.g., firmware) for operation, but the software may not be present when it is not needed for operation.

This definition of "circuitry" applies to all uses of this term in this application, including in any claims. As a further example, as used in this application, the term "circuitry" also covers an implementation of merely a hardware circuit or processor (or multiple processors) or portion of a hardware circuit or processor and its (or their) accompanying software and/or firmware. The term "circuitry" also covers, for example and if applicable to the particular claim element, a baseband integrated circuit or processor integrated circuit for a mobile device or a similar integrated circuit in server, a cellular network device, or other computing or network device.

As used herein, the term "communication network" refers to a network following any suitable communication standards, such as Long Term Evolution (LTE), LTE-Advanced (LTE-A), Wideband Code Division Multiple Access (WCDMA), High-Speed Packet Access (HSPA), Narrow Band Internet of Things (NB-IoT), New Radio (NR) and so on. Furthermore, the communications between a terminal device and a network device in the communication network may be performed according to any suitable generation communication protocols, including, but not limited to, the first generation (1G), the second generation (2G), 2.5G, 2.75G, the third generation (3G), the fourth generation (4G), 4.5G, 5G, the future sixth generation (6G) communication protocols, and/or any other protocols either currently known or to be developed in the future. Embodiments of the present disclosure may be applied in various communication systems. Given the rapid development in communications, there will of course also be future type communication technologies and systems with which the present disclosure may be embodied. It should not be seen as limiting the scope of the present disclosure to only the aforementioned system.

As mentioned above, currently there is no solution for the automatic certificate management for the NFs in the SBA of 5GC. One of the main challenges is to find an efficient and secure mechanism to achieve initial trust for NFs with the certificate server using for example a certificate, just like the vendor certificates used by network elements running on the dedicated hardware.

The above automatic installation of certificates described in background section are not suitable for the NFs of the 5GC, as every NF is not an embedded software application and they are dynamically created on demand. In the 3GPP TDOC S3-221270 (Study on Standardising Automated Certificate Management in SBA), specifically in key issue #2: Security protection of NF certificate enrolment, the aspect of the initial trust is pointed out:

> "An instantiated NF needs to obtain the certificate from the CA for securing the communication with other NFs, encrypting messages, or signing tokens, among other purposes in SBA. Thus, a secure and automated certificate enrolment procedure is indispensable to obtain the certificates. Before issuing a certificate, operator CA/RA needs to establish an initial trust with the requestor NF instance, ensuring that the requestor NF instance is the correct one and is entitled to request a certificate."

Thus, the present disclosure provides a solution for the above problem. The embodiments of the present disclosure propose a scheme to generate an identity certificate for the NF to be used to establish initial trust with an operator certificate server. This would be the first step to achieve an automatic certificate management in the SBA of 5GC via commonly known protocols like CMPv2.

To achieve the automatic certificate management for NFs in SBA of 5GC, every NF is expected to have an initial trust anchor, i.e., an identity certificate in the present disclosure, that is trusted by the operator certificate server to issue an operator end entity certificate signed by the Certificate Authority in operator Public Key Infrastructure (PKI). This end entity certificate can be used by the NF for authentication with its peers during secure communications.

The identify certificate for an NF can be obtained by the following procedure. The NF creates a public-private key pair, generates a Certificate Signing Request (CSR) that contains the public key, and sends the CSR to a private certificate authority (CA). Herein, the private CA is an initial trust anchor function for an NF in an initial certificate enrolment. Then the NF gets the identity certificate for the NF along with a certificate chain of the private CA as a response. The NF's identity certificate can be used for getting an end entity certificate from the operator PKI using CMP protocol.

In some embodiments, the private CA may be a part of the core network. The private CA can sign the public keys to create the identity certificates for NFs to be used to establish trust with the operator certificate server.

In some embodiments, the private CA and NFs may be in the same network/security (trust) domain, thereby they do not need any explicit authentication between them.

In some embodiments, the private CA may be one of sub CAs of the operator PKI or may be a different CA installed by the operator. In either case, the root CA or trust anchor certificate of the private CA must be installed in the operator certificate server as a trust anchor.

In some embodiments, every NF may be provisioned with details of the private CA on its creation/start up. The details of the private CA may be an IP address, a port number, etc.

In some embodiments, the communication between the private CA and the NF may be any of the following: 1) the CSR and the identity certificate embedded in Hyper Text Transfer Protocol (HTTP) messages; 2) Certificate Management Protocol (CMP) protocol; and 3) Any other proprietary/supported approaches.

In some embodiments, the identity certificate can be regenerated as and when the need arises.

With the above solutions, the identity certificate for the NF which is trusted by the operator certificate server can be obtained, and using the identity certificate, the automatic certificate management can be achieved for the NFs within the 5GC as per RFC 4210 and 3GPP TS 33.310.

FIG. 1 illustrates a schematic deployment in which some embodiments of the present disclosure can be implemented. In FIG. 1, an operator/public PKI/CA, a plurality of NFs, NF1, NF2 and NF3, and a private CA are shown. Each of the NFs, NF1, NF2, and NF3, can fetch its identity certificate from the private CA, and then fetch its end entity certificate from the operator/public PKI/CA. The NFs, NF1, NF2 and NF3, and the private CA are in the same security (trust) domain. Although three NFs are shown in FIG. 1, it will be appreciated that any other number of NFs can be used.

Figure 2:
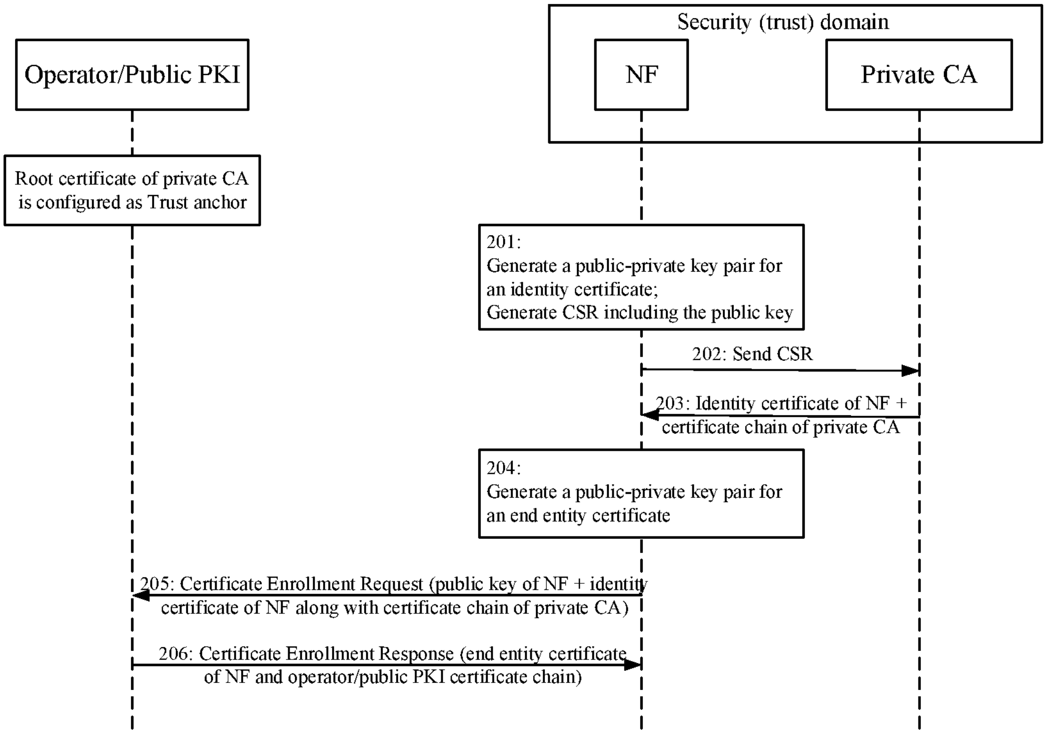
FIG. 2 illustrates an exemplary procedure for automatic certificate management according to some embodiments of the present disclosure.

FIG. 2 illustrates an exemplary procedure 200 for automatic certificate management for NF in SBA of 5GC according to some embodiments of the present disclosure. This exemplary procedure 200 may be implemented in the deployment shown in FIG. 1, and performed by every NF, e.g. NF1, NF2, NF3 in FIG. 1.

As shown in FIG. 2, the NF and the private CA are in the same security (trust) domain. The root certificate of the private CA is configured as trust anchor in the operator/public PKI.

At 201, the NF generates a public-private key pair for an identify certificate, and generates CSR that contains the public key of the public-private key pair.

At 202, the NF sends the CSR to the private CA. The private CA can sign the public key in the CSR to create the identify certificate for the NF, and then at 203, the private CA sends a response that includes the identify certificate of the NF and a certificate chain of the private CA to the NF. The identify certificate can be used to establish the trust with the operator/public PKI. In an example, the CSR may be embedded in a HTTP message, and the response may be a HTTP message.

At 204, the NF generates a further public-private key pair for an end entity certificate, and generates a Certificate Enrollment Request that includes the public key of the further public-private key pair and the identity certificate of the NF along with the certificate chain of the private CA. At 205, the NF sends the Certificate Enrollment Request to the operator/public PKI.

The operator/public PKI can validate the identity of the NF based on the identity certificate, and generate the end entity certificate for the NF. At 206, the operator/public PKI sends a Certificate Enrollment Response including the end entity certificate of the NF and the certificate chain of the operator/public PKI to the NF. Thus, the NF may use the end entity certificate to secure communications with its peers.

Figure 3:
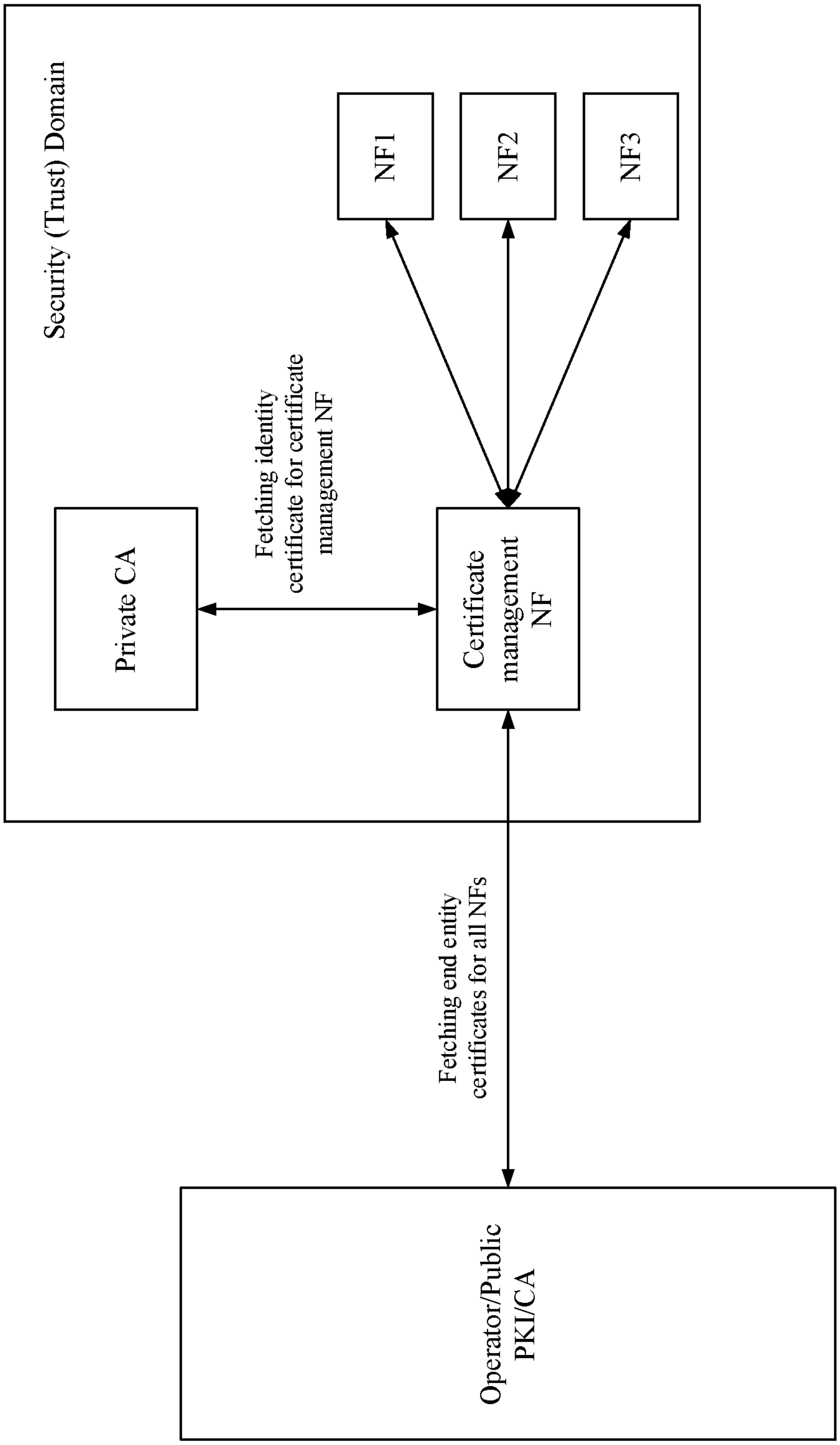
FIG. 3 illustrates a schematic deployment in which some embodiments of the present disclosure can be implemented.

FIG. 3 illustrates a schematic deployment in which some embodiments of the present disclosure can be implemented. In FIG. 3, in addition to the operator/public PKI/CA, the private CA, and the NFs, NF1, NF2 and NF3 as shown in FIG. 1, a certificate management NF which is communicatively coupled to each of the NFs, NF1, NF2 and NF3, is shown. The certificate management NF is present in the same security (trust) domain as the NFs and the private CA, and can provide certificate services for each NF as a central entity. In the deployment shown in FIG. 3, the certificate management NF can mediate the automatic certificate management on behalf of NFs. In an example, the certificate management NF can fetch its identity certificate from the private CA, and can fetch multiple end entity certificates for all the NFs. Then the certificate management NF can deliver the respective end entity certificates to every NF.

Figure 4:
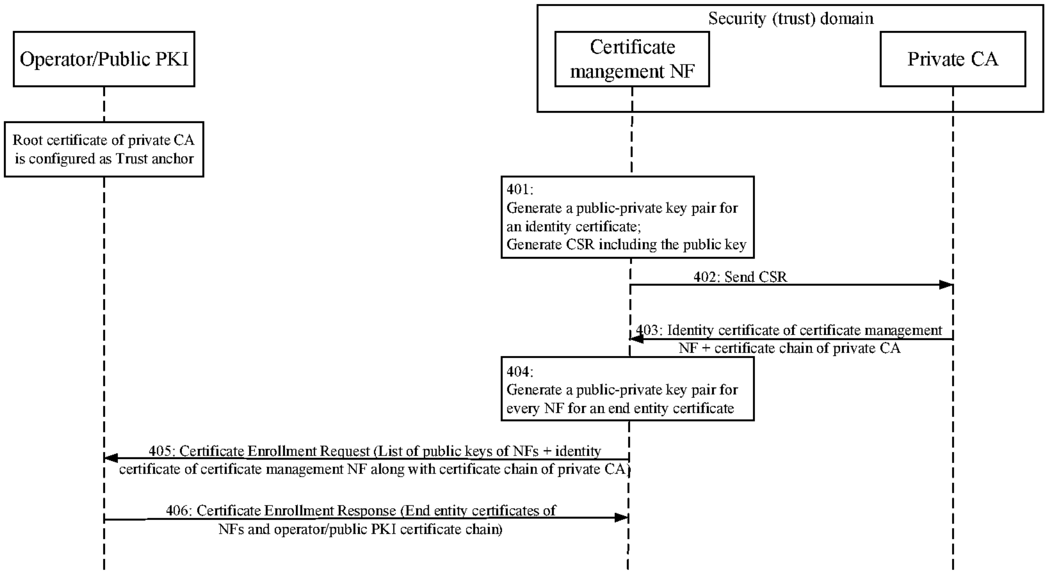
FIG. 4 illustrates another exemplary procedure for automatic certificate management according to some embodiments of the present disclosure.

FIG. 4 illustrates another exemplary procedure 400 for automatic certificate management for NF(s) according to some embodiments of the present disclosure. This exemplary procedure 400 may be implemented in the deployment shown in FIG. 3, and performed by the certificate management NF.

As shown in FIG. 4, the certificate management NF and the private CA are in the same security (trust) domain. The root certificate of the private CA is configured as trust anchor in the operator/public PKI.

At 401, the certificate management NF generates a public-private key pair for an identify certificate, and generates CSR that contains the public key of the public-private key pair.

At 402, the certificate management NF sends the CSR to the private CA. The private CA can sign the public key in the CSR to create the identify certificate for the certificate management NF, and then at 403, the private CA sends a response that includes the identify certificate of the certificate management NF and the certificate chain of the private CA to the certificate management NF. The identify certificate can be used to establish the trust with the operator/public PKI. In an example, the CSR may be embedded in a HTTP message, and the response may be a HTTP message.

At 404, the certificate management NF generates one or more public-private key pairs for respective one or more NFs for an end entity certificate, and generates a Certificate Enrollment Request that includes the public keys of the one or more public-private key pairs and the identity certificate of the certificate management NF along with the certificate chain of the private CA. At 405, the certificate management NF sends the Certificate Enrollment Request to the operator/public PKI.

The operator/public PKI can validate the identity of the certificate management NF based on the identity certificate, and generate the respective end entity certificate(s) for the one or more NFs. At 406, the operator/public PKI sends a Certificate Enrollment Response including the end entity certificate(s) of the one or more NFs and the certificate chain of the operator/public PKI to the certificate management NF. Subsequently, the certificate management NF can deliver the end entity certificate(s) to the respective one or more NFs. Thus, every NF may use its end entity certificate to secure communications with its peers.

Figure 5:
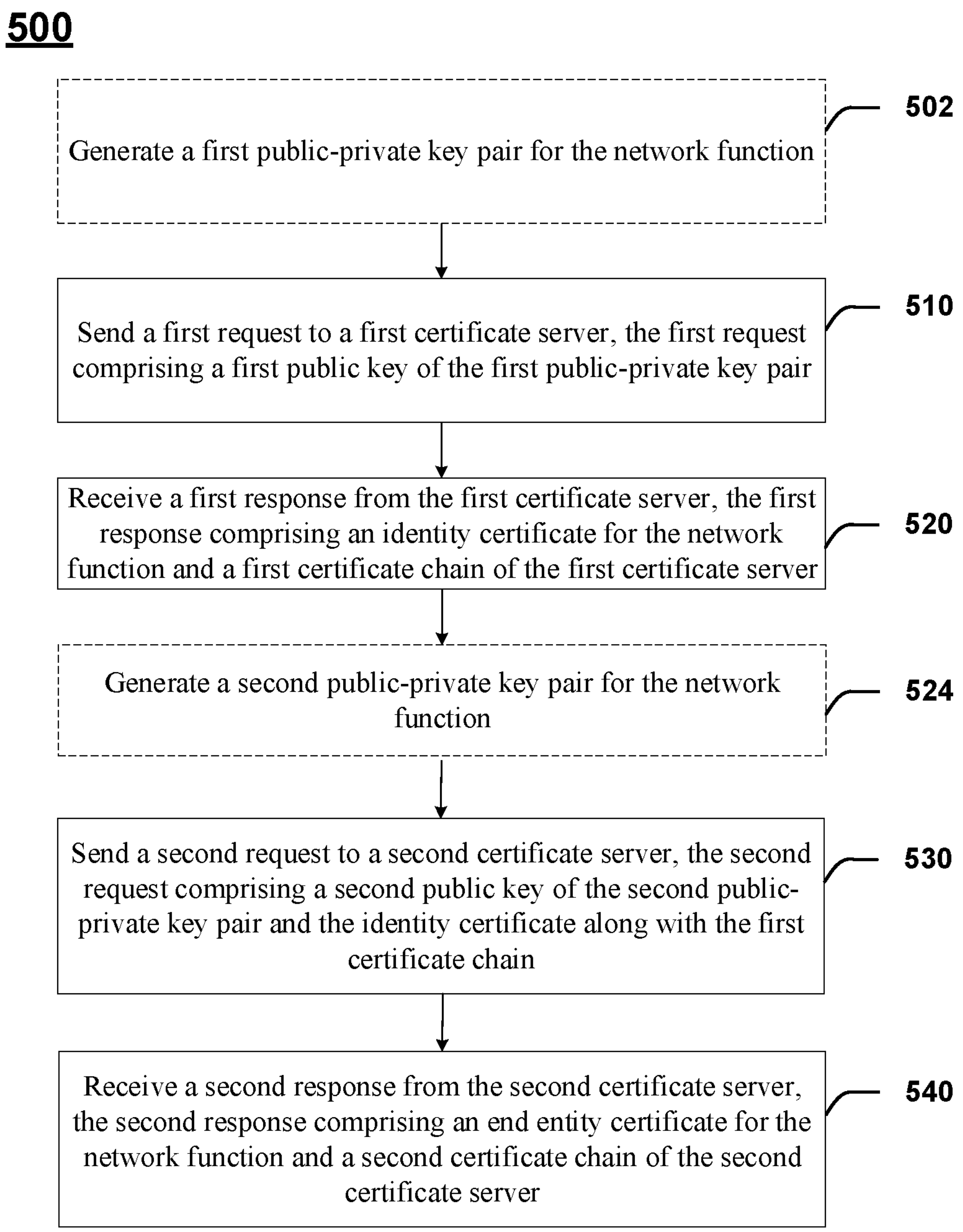
FIG. 5 a flow chart depicting a method according to some embodiments of the present disclosure.

More details of the example embodiments in accordance with the present disclosure will be described with reference to FIG. 5 to FIG. 6. FIG. 5 illustrates a flowchart of a method 500 according to some embodiments of the present disclosure. The method 500 can be implemented at a network entity for implementing an NF, e.g. NF1 or NF2 or NF3 shown in FIG. 1.

As shown at block 510, the method 500 comprises sending a first request to a first certificate server, wherein the first request includes a first public key of a first public-private key pair for the network function. In some embodiments, the network function and the first certificate server may be in the same network/security (trust) domain. In an embodiment, the first certificate server may be the private CA as shown in FIGS. 1 to 4, and may be a part of 5GC network. In an embodiment, the first request is the CSR and is embedded in an HTTP message.

At block 520, the method 500 comprises receiving a first response from the first certificate server, wherein the first response includes an identity certificate for the network function and a first certificate chain of the first certificate server, and wherein the identity certificate is based on the first public key. In an embodiment, the identity certificate may be generated by the first certificate server signing the first public key. In an embodiment, the first response may be an HTTP message.

In some embodiments, the transmission of the first request and the first response may be based on the CMP protocol.

At block 530, the method 500 comprises sending a second request to a second certificate server, wherein the second request includes a second public key of a second public-private key pair for the network function and the identity certificate along with the first certificate chain obtained at block 520. In some embodiments, the second certificate server may be the operator/public PKI/CA in FIGS. 1 to 4, which may be also referred to as the operator certificate server. In some embodiments, the second request may be the Certificate Enrollment Request.

At block 540, the method 500 comprises receiving a second response from the second certificate server, wherein the second response comprises an end entity certificate for the network function and a second certificate chain of the second certificate server. In some embodiments, the root certificate of the first certificate server may be installed in the second certificate server as a trust anchor. Thus, the identify certificate can be used to make the second certificate server sure that the NF is entitled to request the end entity certificate. Then the second certificate server can generate the end entity certificate for the NF by signing the second public key in the Certificate Enrollment Request. In some embodiments, the second response may be the Certificate Enrollment Response.

In some embodiments, the transmission of the second request and the second response may be based on the CMP protocol.

In some embodiments, the method 500 may further comprise generating the first public-private key pair at block 502, and generating the second public-private key pair at block 524.

Figure 6:
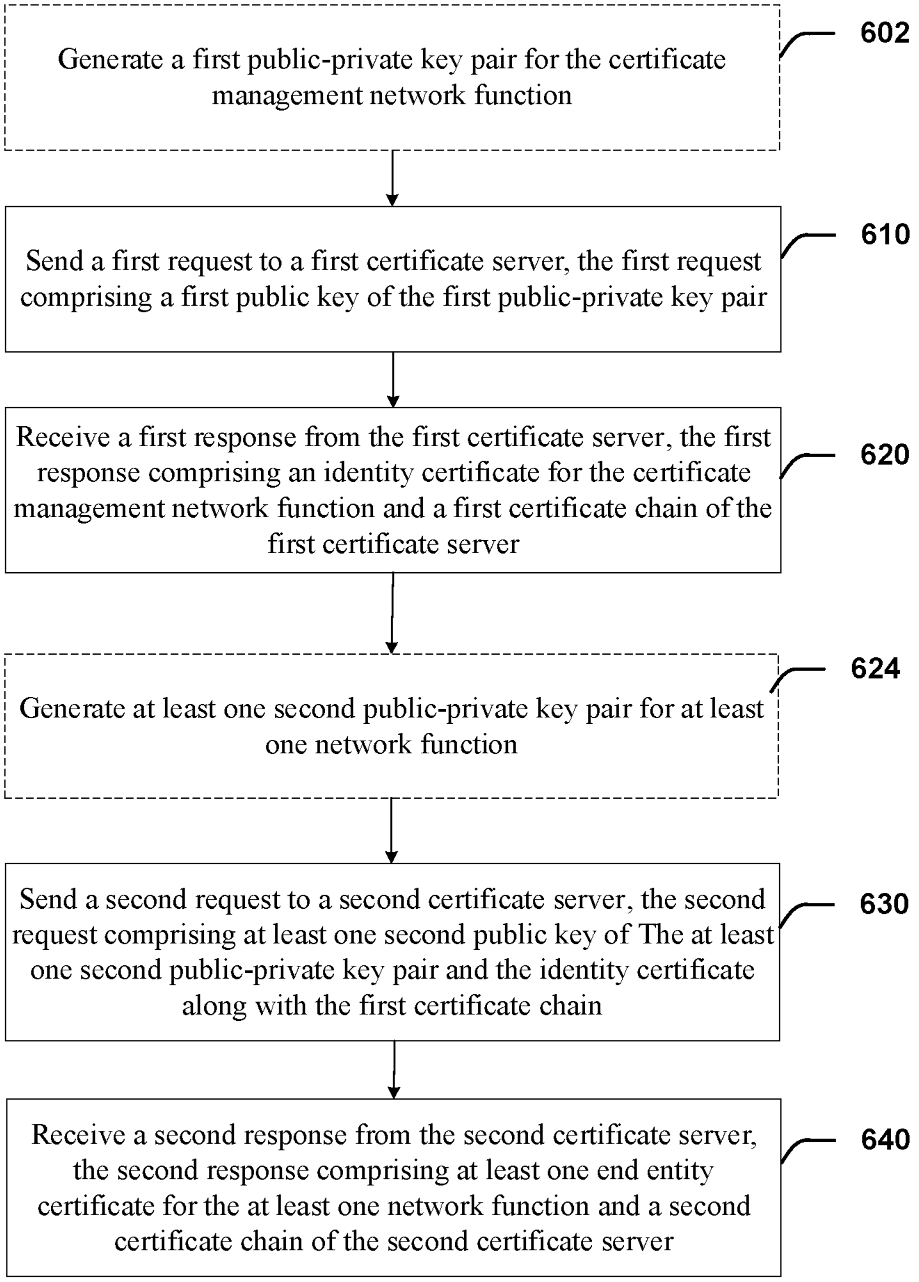
FIG. 6 is a flow chart depicting a method according to some embodiments of the present disclosure.

FIG. 6 is a flow chart depicting a method 600 according to some embodiment of the present disclosure. The method 600 can be implemented at any suitable device. For example, the method 600 can be implemented at a network entity for implementing the certificate management network function e.g. shown in FIGS. 3 to 4.

As shown at block 610, the method 600 comprises sending a first request to a first certificate server, wherein the first request comprising a first public key of a first public-private key pair for the certificate management network function. In some embodiments, the certificate management network function and the first certificate server may be in the same network/security (trust) domain. In an embodiment, the first certificate server may be the private CA as shown in FIGS. 1 to 4, and may be a part of 5GC network. In an embodiment, the first request is the CSR and is embedded in an HTTP message.

At block 620, the method 600 comprises receiving a first response from the first certificate server, wherein the first response includes an identity certificate for the certificate management network function and a first certificate chain of the first certificate server, and wherein the identity certificate is based on the first public key. In an embodiment, the identity certificate may be generated by the first certificate server signing the first public key. In an embodiment, the first response may be an HTTP message.

In some embodiments, the transmission of the first request and the first response may be based on the CMP protocol.

At block 630, the method 600 comprises sending a second request to a second certificate server, wherein the second request includes at least one second public key of at least one second public-private key pair for at least one network function and the identity certificate of the certificate management network function along with the first certificate chain. In some embodiments, the at least one network function may be communicatively coupled to the certificate management network function. In some embodiments, the second certificate server may be the operator/public PKI/CA in FIGS. 1 to 4, which may be also referred to as the operator certificate server. In some embodiments, the second request may be the Certificate Enrollment Request.

At block 640, the method 600 comprises receiving a second response from the second certificate server, wherein the second response comprises at least one end entity certificate for the at least one network function and a second certificate chain of the second certificate server. In some embodiments, the root certificate of the first certificate server may be installed in the second certificate server as a trust anchor. Thus, the identify certificate of the certificate management network function can be used to make the second certificate server sure that the certificate management NF is entitled to request the end entity certificates. Then the second certificate server can generate the end entity certificates as requested by signing the one or more second public keys in the Certificate Enrollment Request. In some embodiments, the second response may be the Certificate Enrollment Response.

In some embodiments, the transmission of the second request and the second response may be based on the CMP protocol.

In some embodiments, the method 600 may further comprise generating the first public-private key pair at block 602, and generating the at least one second public-private key pair at block 624.

Figure 7:
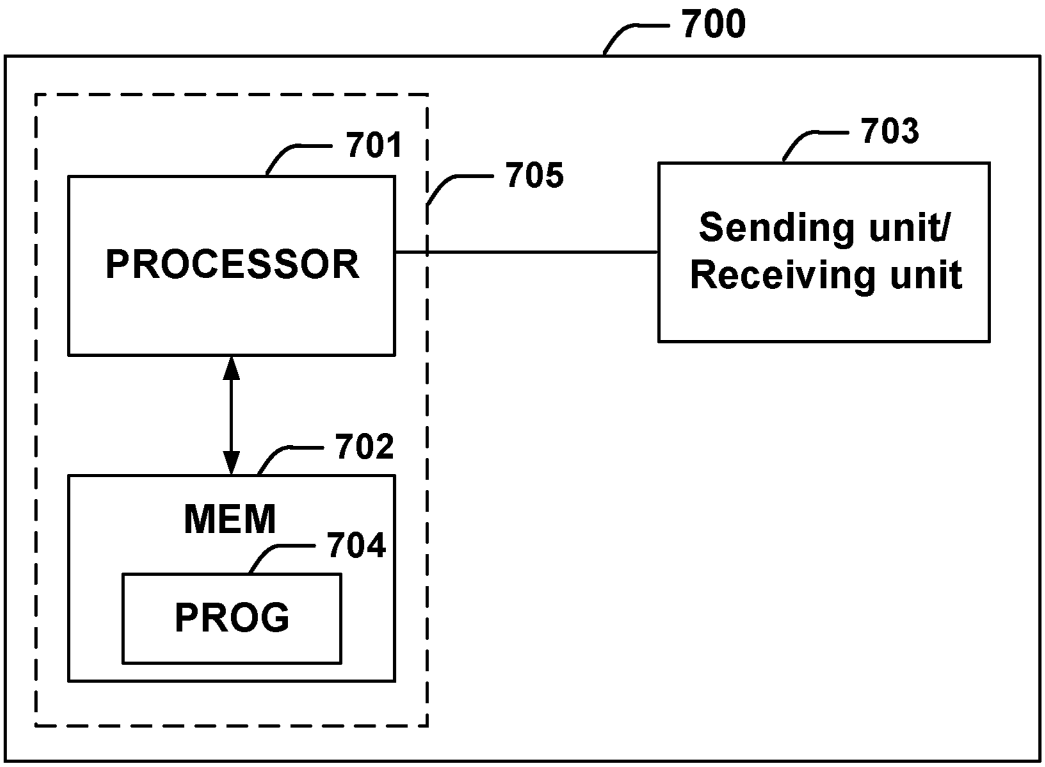
FIG. 7 shows a simplified block diagram of a network entity according to some embodiments of the present disclosure.

Now reference is made to FIG. 7 illustrating a simplified block diagram of a network entity 700 that may be embodied as the network entity for implementing the NF or the network entity for implementing certification management network function. The network entity 700 may comprise at least one processor 701, such as a data processor (DP) and at least one memory (MEM) 702 coupled to the at least one processor 701. The network entity 700 may further comprise a sending unit and a receiving unit 803 coupled to the one or more processors 701.

The processors 701 may be of any type suitable to the local technical environment, and may include one or more of the following: general purpose computers, special purpose computers, microprocessors, digital signal processors (DSPs) and processors based on multicore processor architecture, as non-limiting examples.

The MEMs 702 may be of any type suitable to the local technical environment and may be implemented using any suitable data storage technology, such as semiconductor-based memory devices, magnetic memory devices and systems, optical memory devices and systems, fixed memory and removable memory, as non-limiting examples.

The MEM 702 stores a program (PROG) 704. The PROG 704 may include instructions that, when executed on the associated processor 701, enable the network entity 700 to operate in accordance with the embodiments of the present disclosure, for example to perform one of the methods 500 and 600. A combination of the at least one processor 801 and the at least one MEM 702 may form processing circuitry or means 705 adapted to implement various embodiments of the present disclosure.

Various embodiments of the present disclosure may be implemented by computer program executable by one or more of the processors 701, software, firmware, hardware or in a combination thereof.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosures may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosures may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium, for example, non-transitory computer readable medium, such as a hard disk, optical disk, removable storage media, solid state memory, RAM, etc. As will be appreciated by one of skills in the art, the function of the program modules may be combined or distributed as desired in various embodiments. In addition, the function may be embodied in whole or in part in firmware or hardware equivalents such as integrated circuits, field programmable gate arrays (FPGA), and the like.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-limiting and exemplary embodiments of this disclosure.

We claim:

1. A network entity for implementing a network function, comprising:
- one or more processors; and
- one or more memories storing instructions that,
- when executed by the one or more processors, cause the network entity to:
  - generate a first public-private key pair;
  - send a first request to a first certificate server, the first request comprising a first public key of the first public-private key pair for the network function;
  - receive a first response from the first certificate server, the first response comprising an identity certificate for the network function and a first certificate chain of the first certificate server, wherein the identity certificate is based on the first public key;
  - wherein the first certificate server is a local certificate authority for initial trust establishment, and wherein a second certificate server is an operator certificate authority; generate a second public-private key pair; send, using a Certificate Management Protocol, a second request to the second certificate server, the second request comprising a second public key of the second public-private key pair for the network function and the identity certificate along with the first certificate chain; and
  - receive, using the Certificate Management Protocol, a second response from the second certificate server, the second response comprising an end entity certificate for the network function and a second certificate chain of the second certificate server, wherein a root certificate of the first certificate server is installed in the second certificate server as a trust anchor.

2. The network entity according to claim 1, wherein the network function and the first certificate server are in a same network domain.

3. The network entity according to claim 1, wherein the first request is Certificate Signing Request embedded in a Hyper Text Transfer Protocol, HTTP, message, and wherein the first response is a HTTP message.

4. The network entity according to claim 1, wherein the network entity is further caused to send the first request and receive the first response using Certificate Management Protocol.

5. The network entity according to claim 1, wherein the second request is Certificate Enrollment Request, and wherein the second response is Certificate Enrollment Response.

6. The network entity according to claim 1, wherein the first certificate server is a part of 5G Core network, and wherein the second certificate server is an operator certificate authority.

7. A method performed by a network entity according to claim 1 for implementing a network function.

8. A network entity for implementing a certificate management network function, comprising:
- one or more processors; and
- one or more memories storing instructions that,
- when executed on the one or more processors, cause the network entity to:
  - generate a first public-private key pair;
  - send a first request to a first certificate server, the first request comprising a first public key of the first public-private key pair for the certificate management network function;
  - receive a first response from the first certificate server, the first response comprising an identity certificate for the certificate management network function and a first certificate chain of the first certificate server, wherein the identity certificate is based on the first public key;
  - wherein the first certificate server is a local certificate authority for initial trust establishment, and wherein a second certificate server is an operator certificate authority; generate at least one second public-private key pair; send, using a Certificate Management Protocol, a second request to the second certificate server, the second request comprising at least one second public key of the at least one second public-private key pair for at least one network function and the identity certificate along with the first certificate chain; and
  - receive, using the Certificate Management Protocol, a second response from the second certificate server, the second response comprising at least one end entity certificate for the at least one network function and a second certificate chain of the second certificate server, wherein a root certificate of the first certificate server is installed in the second certificate server as a trust anchor.

9. The network entity according to claim 8, wherein the certificate management network function, the at least one network function and the first certificate server are in a same network domain.

10. The network entity according to claim 8, wherein the first request is Certificate Signing Request embedded in a Hyper Text Transfer Protocol, HTTP, message, and wherein the first response is a HTTP message.

11. The network entity according to claim 8, wherein the network entity is further caused to send the first request and receive the first response using Certificate Management Protocol.

12. The network entity according to claim 8, wherein the second request is Certificate Enrollment Request, and wherein the second response is Certificate Enrollment Response.

13. The network entity according to claim 8, wherein the first certificate server is a part of 5G Core network, and wherein the second certificate server is an operator certificate authority.

* * * * *